Feb. 13, 1934.          W. B. ENGH          1,947,194
PREHEATING DEVICE FOR HYDROCARBON BURNERS
Filed Aug. 1, 1930
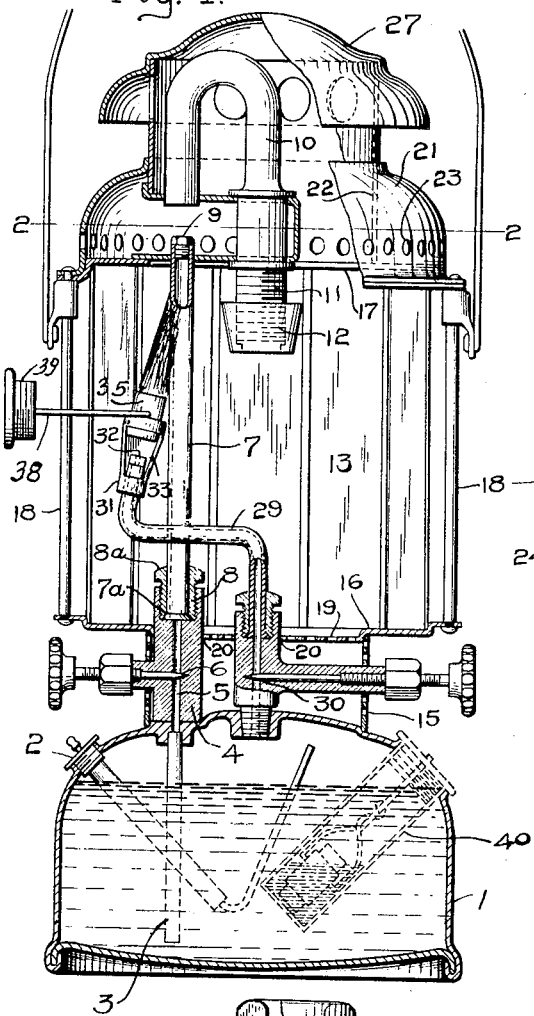
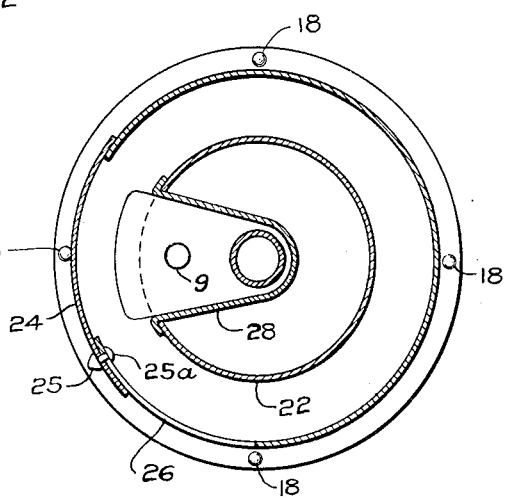
Walter B. Engh,
INVENTOR,
By Thomas G. Lenard,
ATTORNEY.

Patented Feb. 13, 1934

1,947,194

UNITED STATES PATENT OFFICE 1,947,194

PREHEATING DEVICE FOR HYDROCARBON BURNERS

Walter B. Engh, Chicago, Ill., assignor to The Mantle Lamp Company of America, Chicago, Ill., a corporation of Illinois Application August 1, 1930. Serial No. 472,318

14 Claims. (Cl. 158—81)

The invention relates to pre-heating devices for hydrocarbon burners, and comprehends certain features of construction whereby the energy of a small volume of compressed air may be utilized to induce the flow of a large quantity of free air that is to be mixed with the vaporized fuel of said pre-heater.

The invention will be best understood if reference be had to the accompanying drawing, in which Figure 1 is a vertical sectional view showing parts of a lantern in elevation;

Figure 2 is a sectional view taken on the line 2—2 of Figure 1;

Figure 3 is a perspective view of the pre-heater in operative position on the compressed-air tube, parts being broken away to more clearly reveal the construction.

Referring to the drawing, 1 is a reservoir for a heavy hydrocarbon oil, such as kerosene, and 2 is an air pump for filling the space above the fuel in said reservoir with compressed air.

Extending from the bottom of the reservoir is a liquid fuel tube 3 which at its upper end communicates with a valve casing 4 through which extends a duct 5 that may be closed by a valve 6.

Said duct 5 leads to a generator tube 7 having a flared lower end 7a and resting within a cavity of said valve casing 4, an annular screw-threaded nut 8 having a polygonal head 8a being screwed into said valve casing 4 and bearing downward against said flared end 7a.

The generator tube 7 is provided with a small jet orifice 9, and aligned with said jet orifice 9 is a curved mixing tube 10, terminating in a downwardly-projecting expansion chamber 11 on which is screwed a mantle holder 12, a mantle not being shown.

The burner is protected from extraneous air currents by a globe 13 having a door to give access to the enclosed burner. This globe may have a mica wall sustained by a perforated metal collar 15 disposed between it and the reservoir 1. Said globe 13 has a base 16 and a top 17 which are united by rods 18, and said base 16 is provided with air inlets 19, through which air may pass and with openings 20 to receive certain of the burner parts.

Detachably supported by the globe 13 is a canopy 21 having an inner wall 22 and provided at its lower end with perforations 23. Said canopy may be provided with a perforated sliding door 24 having a stud 25 extending through a slot 26 in said canopy 21 and provided with a head 25a. Within the canopy is an open-mouthed jet guard 28, preferably integral with said canopy, extending inward from the inner wall 22 of said canopy, the object of this jet guard being to prevent intermingling of the products of combustion with the combustible vapor flowing into the mixing tube 10. The canopy is provided with a perforated hood 27 through which the products of combustion may escape.

Leading from the space above the liquid fuel in the reservoir 1 is an air tube 29 controlled by a valve 30 and terminating in a mixer 31 having a jet orifice 32 and a side orifice 33 through which air may be entrained by the jet of air discharged by said jet orifice 32. This mixer is so shaped as to receive and temporarily sustain a portable pre-heating torch including a wick 34 enclosed in a wick support 35 having a cavity 35a and a central passage 36.

This wick device has a swivel handle 37, 38, 39, by means of which it may be manipulated.

For convenience, the reservoir 1 is provided with a well 40 for containing a highly volatile or other liquid fuel and in which said wick 34 may be retained when not in use. When, however, pre-heating of the burner is required, said wick 34 and its associated parts are transferred from said well 40 to the mixer 31, so that the jet orifice 32 may supply air through the central passage 36 and entrain air through the side orifice 33 to mix with the vapor rising from said wick 34 when the volatile liquid therein is ignited. The part 39 of the handle 37, 38, 39, has external screw-threads 41 whereby said part may be screwed into and act as a closure for said well 40.

When the apparatus is to be used, air is pumped into the space above the liquid fuel in the reservoir 1, and the saturated wick 34 of the pre-heater and its carrier, 35, 36, 37, 38, is removed from the well 40 within said reservoir 1 and placed on the air mixer 31 which fits said wick carrier so that air supplied by the tube 29 through the now open valve 30, may entrain air through the orifice 33 and mix with vapor from said wick 34 to produce a hot blue-flame for pre-heating the generator 7 which stands adjacent thereto.

The air in the upper part of the reservoir 1, although under high pressure, is small in volume and, if used alone, is liable to be exhausted before pre-heating of the generator 7 is fully accomplished. However, by the use of the mixer 31, only a small volume of the high-pressure air from the reservoir 1 is required, as the high-velocity stream of air from the jet orifice 32 entrains a large volume of free air so that an adequate volume of air is directed through the passage 36 to mix with the fuel from the wick 34 and produce a hot blue flame satisfactory for pre-heating the generator.

When the generator 7 has been heated to high temperature by the flame produced at the wick 34 of the pre-heater, the valve 6 will be opened so that the liquid fuel may pass from the reservoir 1 to and through said generator, wherein it is vaporized and then discharged through the jet orifice 9 into the mixing tube 10 and out through the expansion chamber 11 and the mantle holder 12. Air will be entrained by the jet of fuel entering the mixing tube to thereby produce within a mantle secured to the mantle holder 12 an efficient mantle-heating flame. After the burner is thus in full operation, the pre-heating torch is to be separated from the mixer and the valve 30 closed, said torch being returned to the liquid-fuel well 40, to be again saturated with the liquid fuel therein.

A pre-heater employing compressed air in the manner hereinbefore described, admits of the production of a hot blue flame for vapor-generating purposes, even though a heavy hydrocarbon oil, such as kerosene, is utilized, and this without smoking up the generator or other parts of the lamp or lantern.

The employment of a well for the torch constituting a part of the pre-heater, makes it possible to carry two kinds of fuel in the reservoir and eliminates the need of the usual separate can containing a pre-heating fluid.

Furthermore, it is advantageous to utilize the air pressure which displaces the heavy hydrocarbon fuel in the reservoir as the means for operating the pre-heating torch.

Having thus described my invention, what I claim is:

1. A pre-heating burner having means for sustaining a wick, including a source of high-pressure air, and an opening disposed between said source and said wick-sustaining means through which low-pressure air may be entrained by and supplement the volume of said high-pressure air.

2. A heavy-liquid-fuel burner having a vapor generator, combined with a liquid-fuel reservoir having an air tube leading from the top thereof, an air mixer communicating with said air tube and having an orifice through which air may be entrained by the inductive action of an air current flowing through said air tube, and a wick-holding torch associated with said mixer.

3. A pre-heating burner for heavy-liquid-fuel burners including a wick, an open-ended air passage adapted to deliver air to said wick, and a high-pressure source of air for inducing an air current in said open-ended passage.

4. A pre-heating burner comprising a mixer having a jet orifice and a side orifice through which air may be entrained by air discharged by said jet orifice, and a portable pre-heating torch fitting said mixer and having a wick-holding cavity.

5. An apparatus for burning heavy liquid fuel, including a reservoir for liquid fuel, a main burner having a generator communicating with the fuel space of said reservoir, means for compressing air in the space above said liquid fuel, a pre-heating burner having a separate fuel supply for vaporizing heavy liquid fuel in said generator, a mixer for high and low-pressure air communicating with said pre-heating burner, and an air duct for carrying compressed air from the reservoir to said mixer.

6. A pre-heating burner for the vapor generator of a heavy-liquid-fuel burner, including a mixer for high and low-pressure air and an annular and separable torch through which the air mixture may flow to mix with vapor emanating from liquid fuel held by said torch to produce a non-luminous flame.

7. A pre-heating burner for the vapor generator of a heavy-liquid-fuel burner, including a mixer for high and low-pressure air and a separable torch provided with a wick through which the air mixture may flow to mix with vapor emanating from liquid fuel held by said wick to produce a non-luminous flame.

8. A heavy-liquid-fuel burner having a vapor generator, combined with a pre-heating torch for said generator, including a wick, a mixer for high-pressure and free air, and means associated with said torch for directing the mixed air to vapor rising from said wick to produce a non-luminous flame.

9. A pre-heater, including a fuel-holding and pre-heating torch, a source of high-pressure air leading to said torch and an opening disposed between said source and the fuel holder of said torch through which low-pressure air may be entrained by and supplement the volume of said high-pressure air.

10. A pre-heating burner including a fuel-holding and pre-heating torch, a tube for high-pressure air having a jet orifice, and a mixer in which air delivered from said jet orifice may be blended with and supplement entrained low-pressure air before it passes to said torch.

11. A heavy-liquid-fuel burner having a vapor generator, combined with a liquid-fuel reservoir having an air tube leading from the top thereof, an air mixer communicating with said air tube and having an orifice through which air may be entrained by the inductive action of an air current flowing through said air tube, and a fuel-holding torch for receiving air from said mixer.

12. A heavy-liquid-fuel burner having a generator, combined with a multi-part pre-heating burner one part of which is a removable wick carrier constituting a mixer for fuel and air.

13. A liquid-fuel combustion apparatus, including a reservoir for a heavy liquid hydrocarbon, and a blue-flame burner for said liquid hydrocarbon, combined with a multi-part pre-heating burner communicating with the space above the fuel in said reservoir, one part of said pre-heating burner being a separable torch, and means for forcing compressed air into said space.

14. A pre-heater for heavy hydrocarbons, including an air pipe leading from a compressed air chamber, a central-draft burner having a removable torch including a central air tube and an annular wick, a jet orifice communicating with said compressed air chamber, a lateral opening in said burner connecting with the passage of said torch, through which lateral opening low-pressure air may be entrained by said compressed air, said compressed air and said low-pressure air being mixed in said central tube, and then mixed with the vapor burning at the wick to produce a pre-heating blue flame.

WALTER B. ENGH.